United States Patent [19]

Bleha et al.

[11] 4,180,629
[45] Dec. 25, 1979

[54] POLYMERS CONTAINING A REACTIVE AROMATIC SYSTEM BASED ON P-PHENYLENEDIAMINE DERIVATIVES

[75] Inventors: Miroslav Bleha; Zdeněk Plichta, both of Prague, Czechoslovakia

[73] Assignee: Ceskoslovenska Akademie ved, Prague, Czechoslovakia

[21] Appl. No.: 920,236

[22] Filed: Jun. 29, 1978

Related U.S. Application Data

[62] Division of Ser. No. 625,317, Oct. 23, 1975, Pat. No. 4,127,732.

[30] Foreign Application Priority Data

Oct. 30, 1974 [CS] Czechoslovakia .................. 7412-74
Oct. 30, 1974 [CS] Czechoslovakia .................. 7413-74
Oct. 30, 1974 [CS] Czechoslovakia .................. 7414-74

[51] Int. Cl.² .................. C08F 220/06; C08F 220/56; C08F 226/02
[52] U.S. Cl. .................. 521/65; 526/75; 526/303; 526/312; 526/287; 526/304; 525/329; 525/359; 525/385; 525/336
[58] Field of Search .................. 526/312, 303, 16, 55, 526/287, 304; 521/65

[56] References Cited

U.S. PATENT DOCUMENTS

| 3,640,983 | 2/1972 | Horiguchi et al. | 526/304 |
| 3,975,340 | 8/1976 | Manaka | 526/312 |
| 4,085,005 | 4/1978 | Bleha et al. | 526/312 |

*Primary Examiner*—John Kight, III

[57] ABSTRACT

Polymers containing a reactive aromatic system in the side chain which consist of structural units of the general formula IV:

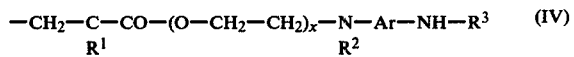

$$-CH_2-\underset{R^1}{\underset{|}{C}}-CO-(O-CH_2-CH_2)_x-\underset{R^2}{\underset{|}{N}}-Ar-NH-R^3 \quad (IV)$$

where
$R^1$ is hydrogen or $CH_3$,
$R^2$ is alkyl containing 1 to 6 carbon atoms,
$R^3$ is an acyl or sulfonic group,
Ar is a bifunctional aromatic residue, and
X = 1 to 4.

Said polymers being subject to further treatment consisting of acid hydrolysis and subsequent modification, e.g., with chloroacetic acid, formaldehyde or diazotizing and coupling with a suitable passive component.

12 Claims, No Drawings

POLYMERS CONTAINING A REACTIVE AROMATIC SYSTEM BASED ON P-PHENYLENEDIAMINE DERIVATIVES

This is a divisional application of Ser. No. 625,317, filed Oct. 23, 1975 now U.S. Pat. No. 4,127,732.

BACKGROUND OF THE INVENTION

The invention relates to monomers of the general formula I with a reactive aromatic system based on p-phenylenediamine derivatives:

$$CH_2=CR^1-CO-(O-CH_2-CH_2)_x-HR^2-Ar-NH-R^3 \qquad (I),$$

where $R^1$ is H or $CH_3$, $R^2$ is $C_1-C_6$ alkyl, $R^3$ is acyl, carboxylic group or sulfonic group. It further relates to methods for preparation of such monomers by the reaction of p-$H_2NC_6H_4N(Et)CH_2CH_2OH$ or p-$H_2NC_6H_4N(CH_2CH_2OH)_2$ derivatives with blocked $NH_2$ groups with chlorides of unsaturated organic acids or by nitrosation, reducing and above mentioned acylation of N-alkylaniline derivatives. If further relates to polymers prepared by polymerization or copolymerization of monomers I, which consist of structural units IV:

$$-CH_2-\overset{|}{C}R^1-CO-(O-CH_2-CH_2)_x-NR^2-Ar-NH-R^3 \qquad (IV),$$

where $R^1$, $R^2$, $R^3$, Ar and x have the above given meaning, and to methods of their preparation. These methods include the free-radical polymerization or copolymerization with acrylic and methacrylic monomers, as acrylamide, methacrylamide. acrylic and methacrylic acids and their esters, vinyl monomers, as butadiene, isoprene, and styrene, bifunctional monomers, as divinylbenzene, methylenebisacrylamide, ethylene glycol dimethacrylate, and with monomers containing OH groups. The polymerization methods further include polymerization in the presence of polymer solvents and precipitants and a crosslinking copolymerization in a dispersion medium which provides porous polymer particles with large inner surface area. Another objective of the invention are polymers containing structural units V:

$$-CH_2-\overset{|}{C}R^1-CO-(O-CH_2-CH_2)_x-NR^2-Ar-N(R^3)R^4 \qquad (V),$$

where $R^1$, $R^2$, Ar and x have the above given meaning and $R^3$, $R^4$ are H, $C_1-C_4$ alkyl or $CH_2COOH$ or where $R^3+R^4$ means =N-group, and methods for their preparation from polymers with units IV consisting in acid hydrolysis and subsequent modification, e.g. with chloroacetic acid, formaldehyde or diazotizing and coupling with a suitable passive component.

Efforts to prepare new kinds of polymers with built-in functional groups, which enable chemical modifications of the polymeric system, lead to syntheses of numerous compounds having the character of monomers. The invention relates to compounds chemically derived from p-phenylenediamine which contain an acrylic or methacrylic residue allowing their polymerization reaction, to synthetic polymers which contain in the side chain a p-phenylenediamine skeleton enabling manifold chemical modifications of the system, and to methods of their preparation. The aim is to prepare such monomers which enable preparation of materials suitable for subsequent application, e.g. as a catalyst of chemical reaction, biologically active preparation, ion exchanger, and the like, by a simple subsequent reaction of the polymer.

Interest in polymers with reactive functional groups, which are raw materials for numerous products of both technological and application importance, caused the rapid development of modified polymeric systems. These polymers are prepared by modification of the fundamental polymeric skeleton by a subsequent chemical reaction, on the one hand, and by copolymerization of suitable monomers with reactive groups capable of further reactions, on the other.

Polymers preformed in this way may be tranformed by further chemical conversions into materials useful for biological applications, technical applications, and the like.

They were developed materials containing an aliphatic or aromatic primary amino group in the side chain which may be used, for example, for further reactions of the bonding character via diazotizing of the aromatic amino group and the subsequent coupling with a suitable kind of substrate. However, most of these systems prefer the one-sided utilization. In addition to it, several reactions provide imperfectly defined products because the modification reactions are not quantitative or the corresponding comonomers have unsuitable reactivity ratios.

An objective of the invention are monomers containing p-phenylenediamine skeleton of the general formula I $$CH_2=\underset{R^1}{\overset{|}{C}}-CO-(C-CH_2-CH_2)_x-\underset{R^2}{\overset{|}{N}}-Ar-NH-R^3 \qquad I,$$

where $R^1$ is hydrogen or methyl, $R^2$ is alkyl containing 1 to 6 carbon atoms, $R^3$ is an acyl or sulfonic group, Ar is a bifunctional aromatic residue, and x=1 to 4.

Monomers of the above given type may be prepared by reaction of chloride of an unsaturated organic acid (for example, acryloyl or methacryloyl chloride) with hydroxy derivative of p-phenylenediamine of the following types:

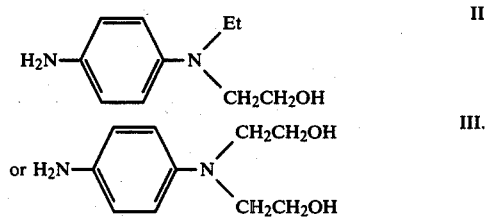

The above mentioned monomers may be also prepared in such way that ethoxylated derivatives of N-alkylaniline or aniline are synthesized and then nitrosated, reduced and subjected to the subsequent reaction with chloride of an unsaturated organic acid, e.g. acryloyl or methacryloyl chloride.

Numerous initial compounds may be employed in preparation of monomers, beginning with common compounds of phenylenediamine type, which are used e.g. in photographic chemistry, as far as to simple basic raw materials. While the first type of preparation from compounds

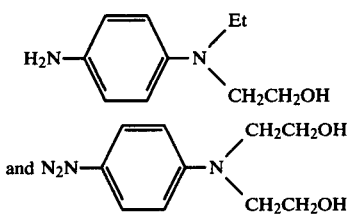

requires, after previous blocking of the free primary amino group, e.g. by acylation (R³), only the reaction with acryloyl or methacryloyl chloride, the stepwise synthesis with the analogous end step must be chosen in other cases.

Monomers of this type are noted for their suitable copolymerisation reactivity ratios with common monomers. They can be prepared as mono- or bifunctional monomers at the same time and, consequently, used for preparation of linear polymers soluble in proper solvents or insoluble crosslinked polymers.

An objective of the invention are further polymers containing a reactive aromatic system in the side chain, which consist of structural units of the general formula IV:

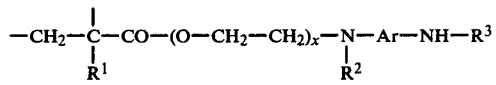

where $R^1$ is hydrogen or methyl, $R^2$ is alkyl containing 1 to 6 carbon atoms, $R^3$ is an acyl, carboxylic or sulfonic group, Ar is a bifunctional aromatic residue, and x=1 to 4.

Polymers of the general formula IV are prepared by a free radical polymerization of the corresponding monomer in the presence of an initiator of free-radical polymerization at or above the decomposition temperature of the initiator.

As further comonomers, they may be advantageously used the monomers of methacrylic or acrylic series, for instance acrylamide, methacrylamide, acrylic acid, methacrylic acid, of their esters, and vinyl compounds, as butadiene, isoprene, styrene, and others.

The polymerization is advantageously carried out in the presence of polymer solvents and precipitants or in a dispersion medium under formation of porous polymer particles having large inner surface area.

The invention enables to prepare a polymeric system, the chemical reactivity of which given by the conjugated nitrogen system allows to perform several reactions leading to products with specific properties. With respect to advantageous copolymerization reactivity ratios, especially with acrylates and methacrylates, materials of the defined structure with high content of reactive groups may be prepared. The copolymers may be indeed prepared also with other types of monomers, as with styrene, divinylbenzene and their derivatives, isoprene, butadiene, and others.

The character of the reactive system prefers namely copolymerizations with monomers of hydrophilic nature, e.g. with esters containing hydroxyl group in the side chain, i.e. esters of glycols, polyglycols or glycerol, with amides, i.e. acrylamide, methacrylamide, or N-substituted acrylamides and methacrylamides, and naturally, with methacrylic and acrylic acids.

The preparation of copolymers in the form of a three-dimensional network by copolymerization with multi-functional monomers, as for instance with divinylbenzene, ethylene glycol dimethacrylate or methylenebisacrylamide, leads to insoluble homogeneous or heterogeneous copolymers. In the presence of a suitable solvent system, polymers with large inner surface area and porosity are formed, which properties predetermine these materials for broad application, namely those prepared in the form of small spherical particles for chromatographic and catalytic purposes and for ion exchange.

Polymers preformed in this way may be transformed by further chemical conversions into materials useful for biological and technical applications, and the like.

Another objective of the invention are polymers containing a reactive aromatic system in the side chain, which consist of structural units of the general formula V:

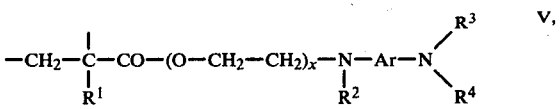

where $R^1$ is hydrogen or methyl, $R^2$ is alkyl containing 1 to 6 carbon atoms, $R^3$ and $R^4$ are hydrogen, alkyl containing 1 to 4 carbon atoms or —$CH_2COOH$ group, or $R^3+R^4$ is the group =N—, Ar is a bifunctional aromatic residue, and x=1 to 4.

Polymers according to this invention may be prepared by subjecting the polymer of the general formula IV

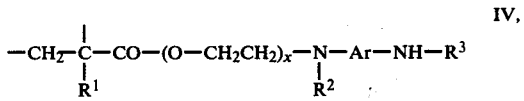

where $R^1$ is hydrogen or methyl, $R^2$ is alkyl containing 1 to 6 carbon atoms, $R^3$ is an acyl, carboxylic or sulfonic group, Ar is a bifunctional aromatic residue, and x=1 to 4, to acid hydrolysis and modification of the resulting product.

The reactive site is, for example, a primary aromatic amino group which may be diazotized and used in coupling reactions with various components.

Alkylation of the primary amino group carried out, for example, by reaction with formaldehyde (see Example 9) leads to aromatic tertiary alkylamine built into the polymeric skeleton.

Another example consists in formation of a polymeric derivative of aminodiacetic acid by reaction of the polymer with choroacetic acid.

Polymers according to the invention may be advantageously used as ion exchangers, catalysts of chemical reactions, for biological applications, etc.

Synthesis of monomers and polymers containing the p-phenylenediamine skeleton is further illustrated in example of performance without, however, limiting the scope of this invention to these examples.

EXAMPLE 1

N-Ethyl-N-(2-hydroxyethyl)p-phenylenediamine (560 g) is dissolved in 2 l. of water at 45° C., 230 g of acetanhydride is added under stirring and the mixture is neutralized with sodium hydroxide to the alkaline reaction (pH=9). After dilution with three volumes of water, a crystalline product (m.p. 133° C.) is obtained, which is further reacted with methacryloyl chloride (10% excess) in the medium of anhydrous pyridine. Methacryloyl chloride is added into the reaction mixture at 5° C. within one hour and the temperature is then maintained at 25°–30° C. under stirring for 10 hr. After dilution with 5 volumes of water, the oil separates which gives by crystallization from toluene and ethanolwater mixture the crystalline product (m.p. 93°–94° C.),

EXAMPLE 2

The monomer is prepared according to Example 1, with the distinction that acetate, sulfate or hydrochloride of N-ethyl-N-(2-hydroxyethyl)-p-phenylenediamine is used as the starting material and allowed to react with methacryloyl chloride according to Example 1.

EXAMPLE 3

N-Ethylaniline (0.5 mole) is mixed with 0.6 mole of ethylene oxide in an autoclave, which is then sealed, pressurized with nitrogen to 30 atm and heated up to 130° C. within 2 hr. Ethoxyethylated product is obtained in the yield of 95% related to the starting N-ethylaniline. This product is subjected to nitrosation at the temperature 5° C. with sodium nitrite solution, then reduced with tin in hydrochloric acid and, eventually, subjected to the methacrylation process according to Example 1.

EXAMPLE 4

N-Ethyl-N-(2-methacryloylethyl)-N'-acetyl-p-phenylenediamine (5 g) is dissolved in 10 g of Methylcellosolve and 0.01 g of azobisisobutyronitrile is added. The mixture is flushed with nitrogen and polymerized at 60° C. The resulting polymer solution is diluted and precipitated into ether. The polymer is soluble in Methylcellosolve, acetone and diluted hydrochloric acid.

EXAMPLE 5

N-Ethyl-N-(2-methacryloylethyl)-N'-acetyl-p-phenylenediamine (2.6 g) is mixed with 2.7 g of ethylene glycol monomethacrylate and 0.1 g of azobisisobutyronitrile. Polymerization at 50° C. gives a hard glossy material.

EXAMPLE 6

N-Ethyl-N-(2-methacryloylethyl)-N'-acetyl-p-phenylenediamine (1 g) is dissolved in 4 g of methyl methacrylate and 1.3 wt.% of azobisisobutyronitrile is added. The mixture is sealed in an ampoule under nitrogen and gives after polymerization at 50° C. for 10 hours a glassy polymeric plug.

EXAMPLE 7

N-Hydroxyethyl-N-(2-methacryloylethyl)-N'-acetyl-p-phenylenediamine (1.5 g) is dissolved in 4.5 g of ethylene glycol monomethacrylate and 0.006 g (i.e. 0.1 wt.%) of azobisisobutyronitrile is added. The mixture is transferred into a popolymerization mold formed by two planparallel plates. The polymer resulting after polymerization at 60° C. for 8 hr has a form of a homogeneous plate.

EXAMPLE 8

A polymerization mixture consisting of 31.9 g of ethylene glycol dimethacrylate, 29.4 g of ethylene glycol monomethacrylate, 20.4 g of N-ethyl-N-(2-methacryloylethyl)-N'-acetyl-p-phenylenediamine and 0.82 g (1 wt.% on monomers) of azobisisobutyronitrile is polymerized with addition of 98.5 g of cyclohexanol and 9.7 g of dodecanol in a medium consisting of 600 g of water and 6 g of polyvinylpyrrolidone in a reactor at the temperature 50° C. for 2 hr and at 65° C. for further 8 hr. Porous gel particles are obtained which exhibit the specific surface area 150 m$^2$/g.

EXAMPLE 9

The polymer prepared by the procedure described in Example 8 (5 g) was subjected to the acid hydrolysis in diluted hydrochloric acid (1:1) by boiling for 30 min. This gel is mixed with 50 ml of 98% formic acid and 2 ml of 37% aqueous solution of formaldehyde is added under cooling. After 1 hr of stirring at the ambient temperature, the mixture is boiled (at 100° C.) for 24 hr. The resulting gel—alkylated product—is washed with water and ethanol and dried.

EXAMPLE 10

Diazotizing and coupling with R-acid

Diazotizing

The washed gel after acid hydrolysis prepared by procedures described in Examples 8 and 9 is dispersed in hydrochloric acid 1:2. The suspension is cooled to −10° C. and a 10% solution of sodium nitrite is added under vigorous stirring within 1 hr in a 1.5 fold amount on NH$_2$ groups of the polymer. After addition of the whole amount, the mixture is stirred at the same temperature for another 15 min. The gel is then filtered and thoroughly washed with water and five times with 0.5 N HCl.

Coupling

An aqueous solution of R-acid is poured into the filtered gel at 5° C.; the resulting mixture has pH 1.5–2. The mixture is alkalized with borax under stirring coupling takes place at pH 7–8 which exhibits itself by turning the gel black. The mixture is stirred for another 5 hr. On completion of the reaction, the gel is thoroughly washed with water, 1 N KOH, water, 1 N H$_2$SO$_4$, water, and ethanol alternatively as long as the washing liquid is no longer colored. The product is dried from ethanol and characterized by the amount of SO$_3$H groups in the polymer.

EXAMPLE 11

Reaction with chloroacetic acid

The gel after acid hydrolysis which was washed until the washing water was neutral is dispersed in a solution of sodium chloroacetate and sodium carbonate (1 mole of chloroacetate and 0.5 mole of carbonate, the solution saturated at 70° C.). Twenty fold excess of chloroacetate on aamount of NH$_2$ groups is used. The mixture is stirred in an inert atmosphere at 95° C. for 8 hr. After cooling, the gel is filtered and thoroughly washed with 1 N HCl and water and dried from ethanol. The product is characterized by the amount of functional groups

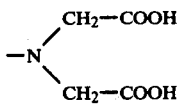

in the polymer.

We claim:

1. Polymers containing a reactive aromatic system in the side chain which consist of structural units of the general formula IV:

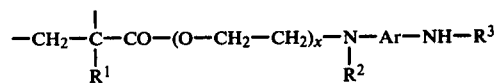

where
R$^1$ is hydrogen or CH$_3$,
R$^2$ is alkyl containing 1 to 6 carbon atoms,
R$^3$ is an acyl or sulfonic group,
Ar is a bifunctional aromatic residue, and
x = 1 to 4.

2. Method for preparation of polymers according to claim 1, wherein a monomer of the general formula I

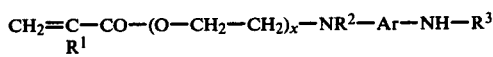

where
R$^1$ is hydrogen or CH$_3$
R$^2$ is alkyl containing 1 to 6 carbon atoms
R$^3$ is an acyl or sulfonic group,
Ar is a bifunctional aromatic residue, and
X = 1–4 is polymerized by a free-radical mechanism in the presence of a free-radical polymerization initiator at or above its decomposition temperature.

3. Method for preparation of polymers according to claim 2, wherein monomers of the acrylic series or methacrylic series are used as further comonomer, as for instance, acrylamide, methacrylamide, acrylic acid, methacrylic acid, or their esters.

4. Method for preparation of polymers according to claim 2, wherein vinyl compounds, for example, butadiene, isoprene or styrene, are used as comonomers.

5. Method for preparation of polymers according to claim 2, wherein a bifunctional compound of the type divinylbenzene, methylenebisacrylamide or ethylene glycol dimethacrylate is used as the further monomer.

6. Method for preparation of polymers according to claim 2, wherein further monomers used have CH— groups in their side chain.

7. Method for preparation of polymers according to claim 2 wherein the polymerization is carried out in a dispersion medium and results in formation of porous polymer particles with large inner surface area.

8. Method for preparation of polymers according to claim 6, wherein the polymerization is carried out in a dispersion medium and results in formation of porous polymer particles with large inner surface area.

9. Method for the preparation of polymers according to claim 2, wherein the polymerization is carried out in the presence of a solvent and precipitant of the polymer.

10. Method for the preparation of polymers according to claim 6, wherein the polymerization is carried out in the presence of a solvent and precipitant of the polymer.

11. Polymers containing a reactive aromatic system in the side chain and consisting of structural units of the general formula V:

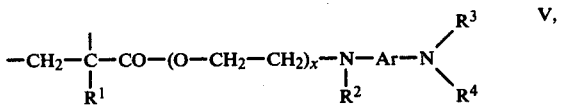

where
R$^1$ is hydrogen or CH$_3$,
R$^2$ is alkyl containing 1 to 6 carbon atoms,
R$^3$ and R$^4$ means hydrogen, alkyl containing 1 to 4 carbon atoms, the —CH$_2$COOH group, or where R$^3$ and R$^4$ means also the =N— group,
Ar is a bifunctional aromatic residue, and
x = 1 to 4.

12. Method for preparation of polymers according to claim 11, wherein polymer of the general formula IV is subjected to acid hydrolysis and the resulting product is modified, for example, by reaction with chloroacetic acid, formaldehyde or by diazotizing and subsequent coupling.

* * * * *